(12) United States Patent
Mitzimberg (10) Patent No.: US 11,095,642 B2
(45) Date of Patent: Aug. 17, 2021

(54) VERIFYING USER IDENTITY THROUGH HUMAN / COMPUTER INTERACTION

(71) Applicant: Cylance Inc., Irvine, CA (US)

(72) Inventor: Justin A. Mitzimberg, Portland, OR (US)

(73) Assignee: Cylance Inc., Irvine, CA (US)

( * ) Notice: Subject to any disclaimer, the term of this patent is extended or adjusted under 35 U.S.C. 154(b) by 140 days.

(21) Appl. No.: 16/183,411

(22) Filed: Nov. 7, 2018

(65) Prior Publication Data

US 2020/0145416 A1  May 7, 2020

(51) Int. Cl.
| | | |
|---|---|---|
| *H04L 29/06* | (2006.01) | |
| *G06N 99/00* | (2019.01) | |
| *G06N 20/00* | (2019.01) | |
| *G06F 21/55* | (2013.01) | |

(52) U.S. Cl.
CPC ........ *H04L 63/0876* (2013.01); *G06F 21/552* (2013.01); *G06F 21/556* (2013.01); *G06N 20/00* (2019.01); *H04L 63/08* (2013.01); *H04L 63/083* (2013.01); *H04L 63/1483* (2013.01); *G06F 2221/2115* (2013.01)

(58) Field of Classification Search
CPC .... G06F 21/552; G06F 21/556; G06F 21/316; G06F 2221/2115; H04L 63/0876; H04L 63/1483; H04L 63/08; H04L 63/083; G06N 20/00

See application file for complete search history.

(56) References Cited

U.S. PATENT DOCUMENTS

| 10,073,763 | B1* | 9/2018 | Raman | G06F 11/3684 |
|---|---|---|---|---|
| 10,439,886 | B2* | 10/2019 | Lapiotis | H04L 41/0813 |
| 2009/0089592 | A1 | 4/2009 | Kudo | |
| 2014/0189776 | A1 | 7/2014 | Diehl | |
| 2016/0142541 | A1* | 5/2016 | Sharpe | H04M 3/5141 |
| | | | | 379/92.01 |
| 2016/0308884 | A1* | 10/2016 | Kent | G06F 21/316 |
| 2017/0161478 | A1* | 6/2017 | Stavrou | G06F 21/316 |

(Continued)

OTHER PUBLICATIONS

Frank et al.,"Touchalytics: on the Applicability of Touchscreen Input as a Behavioral Biometric for Continuous Authentication," IEEE Transactions on Information Forensics and Security, 8(1):136-148 (2013).

*Primary Examiner* — Mohammad A Siddiqi
(74) *Attorney, Agent, or Firm* — Jones Day (57) ABSTRACT

An identity of a user on a first computing node of a plurality of nodes within a computing environment is authenticated. A first authentication score for the user is calculated at the first computing node using at least one machine learning model. The first authentication score characterize interactions of the user with the first computing node. Subsequent to such authentication, traversal of the user from the first computing node to other computing nodes among the plurality of computing nodes are monitored. An authentication score characterizing interactions of the user with the corresponding computing node are calculated at each of the nodes using respective machine learning models executing on such nodes The respective machine learning models use, as an attribute, an authentication score calculated at a previously traversed computing node. Thereafter, an action is initiated at one of the computing nodes based on the calculated authentication scores.

20 Claims, 5 Drawing Sheets

(56) References Cited

U.S. PATENT DOCUMENTS

| | | | |
|---|---|---|---|
| 2017/0372056 A1* | 12/2017 | Narasimhan | G06F 21/36 |
| 2018/0069867 A1 | 3/2018 | Grajek et al. | |
| 2018/0124082 A1* | 5/2018 | Siadati | H04L 63/1425 |
| 2018/0316704 A1 | 11/2018 | Durairaj et al. | |
| 2019/0089720 A1* | 3/2019 | Aditham | H04L 9/3239 |
| 2020/0028850 A1* | 1/2020 | Ouellette | H04L 63/107 |
| 2020/0042723 A1* | 2/2020 | Krishnamoorthy | G06F 21/40 |

* cited by examiner

VERIFYING USER IDENTITY THROUGH HUMAN / COMPUTER INTERACTION

TECHNICAL FIELD

The subject matter described herein relates to techniques for verification of computer user identity by characterizing human/computer interactions.

BACKGROUND

Computers and related software systems are increasingly susceptible to attacks from malicious actors. In addition to attackers finding network vulnerabilities and exploiting them, attackers are masquerading as trusted insiders. By the use of phishing e-mails and other exploits, attackers can secure login credentials which allow them to log into various computing systems and infiltrate the corresponding computing environment. While role-based access level mechanisms can restrict some activities and access within the computing environment, such restrictions are often static in nature and fail to prevent malicious activity that such a user would otherwise be authorized to conduct.

SUMMARY

In a first aspect, an identity of a user on a first computing node of a plurality of nodes within a computing environment is authenticated. A first authentication score for the user is calculated at the first computing node using at least one machine learning model. The first authentication score characterize interactions of the user with the first computing node. Subsequent to such authentication, traversal of the user from the first computing node to other computing nodes among the plurality of computing nodes are monitored. An authentication score characterizing interactions of the user with the corresponding computing node are calculated at each of the nodes using respective machine learning models executing on such nodes The respective machine learning models use, as an attribute, an authentication score calculated at a previously traversed computing node. Thereafter, an action is initiated at one of the computing nodes based on the calculated authentication scores.

The action can include severing a connection between the user and the corresponding computing node when one of the authentication scores exceed a pre-defined threshold.

The action can include re-authenticating the user at one of the computing nodes when one of the authentication scores exceed a first pre-defined threshold but are below a second pre-defined threshold.

Each of the computing nodes can transmit their respective calculated authentication scores to a central processing server. With such variations, the central processing server can transmit at least one authentication score from a previously traversed computing node to a subsequently traversed computing node. In other cases, the nodes send such authentication scores directly to other nodes.

A user profile can be accessed at the first computing node. Next, deltas (i.e., differences, etc.) between the user profile and current activity of the user on the first computing node can be identified. These deltas can be used to calculate the respective authentication score. The user profile can characterize user actions at each of a plurality of computing states The states can include one or more of freshly booted, interactive user login, non-interactive user login, user log out, or user session lock.

In some implementations, an endpoint detection and response system records activities of the user at one of the computing nodes. Data characterizing the recorded activities can be transmitted to a central processing server.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for more precise user authentication purposes that characterize how users traverse nodes within a computing environment.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to a monitored computing environment in which user authentication is determined based, in part, on a characterization of the behavior of such user as it traverses various nodes within such computing environment. In particular, the current subject matter is directed to measuring, profiling and extrapolating user behavior and their effect on a networked computer system as a method of separating noise typically present in a computing environment from the signal indicative of an attack.

In some variations, the user initially accesses a networked computer system such as a Windows-based computer attached to an Active Directory domain. The user can be assumed to have a "home" system that is monitored. Biometric measurements can be obtained which characterizes how the user interacts with its home system. These measurements can be characterized as including physiological and psychological measurements.

Physiological measurements can be taken from users as they navigate the graphical user interface a computer (i.e., desktop, laptop, mobile phone, tablet, etc.) presents them through physical interaction. For example, such measurements can characterizes keyboard, touchpad, and/or mouse dynamics, but may also include other measurements such as body movement if the computer has those input methods. While these measurements can be the most accurate in building a user profile, they require a specific set of circumstances to be useful. In particular, physiological measurements require a user to be present at a computer that is being monitored thus requiring an attacker to also have physical access to a monitored computer to be detected.

With the current subject matter, in addition to such physiological measurements, other measurements can be useful in authenticating a user such as how such users interact with computing nodes other than the home computer forming part of the computing environment. As one example, a WINDOWS remote interaction system driver (e.g. rdpwd.sys, vnccom.sys) can be monitored which, in turn, allows physiological measurements to be extended to remote interactions (i.e., remote computing nodes differing from the one at which the user initially logged on).

Psychological measurements can be characterized as a cognitive interpretation of how a user interacts with a computer. There are no common methods of measuring psychological human-computer-interaction (HCl), however some research has been done by observing email behavior, game strategy and detecting a user's command-line lexicon. Some of this research has applicability in detecting attacker nuance, such as measuring a user's command-line comprehension, however there are other, better indicators that can be measured. These measures, when taken in the aggregate, can profile a user's skill level and computing comprehension.

The current subject matter can, for example, generate user profiles or otherwise characterize a user's skill level in how they interact with a computer. Various types of attributes can be used for such characterization including the type and frequency of commands entered on a command-line, which applications are used by the user, the frequency and type of permanent modifications to the computer system, application features used (e.g., the use of application features that are not presented directly within the application's default UI such as keyboard shortcuts, settings menus, and the like), and/or the frequency and reason that a user requests Administrative access.

The characterization of a user can also take into account other information such as what prevalence of applications does the user launch, what prevalence of websites does a user visit, what prevalence of system calls does a user make, how often does the user download and launch applications from the Internet, how often do they access protected system files or directories, and/or how does the user launch programs.

In addition, monitored attributes can be used to determine a user's role on the computer. For example, a user's frequent use of applications that permanently modify the system can be indicative of a system administration role. Frequent use of workstation class applications can be indicative of a standard user role. Frequent use of uncommon applications or processes that feature prominently in clusters of like computers can be indicative of an application administrator role With the current subject matter, a user's profiled skill level, when taken with other identifying information, like role and the type of computing system they are interacting with can assist in verifying the user's identity on that computer system.

A networked computer system, by its definition, does not exist in a vacuum. Every computer in a networked environment communicates with other systems for various reasons, whether its attempting to get or renew an IP address from a local DHCP server, broadcasting ARP to find the MAC of a local IP address or connecting to WINDOWS Update. Computer systems can also run services of their own with which other computer systems can connect.

Every system can have a defined set processes or services that are required for basic functionality. These processes have well defined functions that can include network activity. For example, standard processes, required for basic functionality of a WINDOWS system in an Active Directory environment can be accurately measured, profiled and extrapolated for an entire network. This measurement can include resource requirements (CPU/Memory/Storage), network traffic received, and/or generated and system calls. Various processes that can uniquely identify a cluster of networked computers can be measured, profiled and extrapolated against any other networked computer that falls within that cluster. The existence of uncommon processes in a mostly heterogeneous networked environment is a significant feature. When taken in aggregate, the standard, common and uncommon processes running on a computer can accurately identify the role of that computer and therefore define a standard model of interaction for similarly clustered user profiles.

As mentioned above, every networked system communicates with other systems (sometimes referred to herein as nodes). The frequency and type of communication will identify relationships between such nodes. Two computers that show a strong relationship can be considered peers. Depending on the type of communication, peer relationships can extend to N+1 nodes. For example, if a user logs into their workstation and establishes a remote interactive session with a server and then from there, connects to another machine in any form that requires authentication then all three machines share a relationship and can be considered peers. Clusters of peers identify neighborhoods. Communication patterns within and between neighborhoods can be measured and profiled. Significant deviations can indicate an unauthorized user has access to the system or an authorized user is taking aberrant and potentially malicious actions within the computing environment. Some computer systems exist in multiple neighborhoods because of their role (e.g., domain controllers, etc.). These systems may need to be profiled using other means.

Various types of user authentication mechanisms can be used herein. Example mechanisms are described in each of the following patent applications (the contents of which are hereby fully incorporated by reference): U.S. patent application Ser. No. 15/696,057 filed on Sep. 5, 2017 and entitled: "Computer User Authentication Using Machine Learning" and U.S. patent application Ser. No. 15/808,533 filed on Nov. 9, 2017 and entitled: "Password-less Software System User Authentication".

Other pieces of information can be used to profile and cluster similar computer systems. For example, information such as installed drivers, installed software and versions, and/or hardware installed.

A WINDOWS-based system exists in one of several states in reference to users and with the current subject matter, are measured differently:

Freshly booted. The system has been powered on or restarted and has presented the logon screen. No user has logged in locally or remotely. This is the computer in its most pristine state and can be baselined at this time.

User logs in interactively. The system completes the authentication process and the user specific system configuration and processes are launched. This can occur multiple times on a multi-user system. User interaction is expected and can be measured at this point.

User logs in non-interactively. The system completes the authentication process and user specific commands are executed. This can occur many times per user/session depending on the application used or the role of the computer. Process-based profiles can be measured at this point, but data will be limited.

User logs out. The user closes the logon session. User specific processes launched in this session should terminate. User interaction terminates. Although not completely pristine, a system can probably be baselined at this point.

User locks a session. The user stops interacting with the computer but does not close the session. This can occur either through inactivity or by actively locking the machine. User processes continue to run. Processed based profiles can continue to be measured.

User reestablishes a session. The user interacts with a computer after a period of inactivity. Although authentication can still take place, this differs from logging in by not establishing a new session. User interaction can be measured.

In addition to monitoring how the user interacts with a computer, information characterizing how the computer reacts with to such interaction. For example, changes in resources used in the standard, common and uncommon processes when a user interacts with the system can be monitored (with each process being a data point/attribute for use by one or more models such as machine learning models). How the network communication profile changes when a user interacts with the system can be monitored (e.g., each connection to peers and other neighborhoods can be a data point/attribute, etc.). By measuring the changes that a system undergoes when a user interacts with it and comparing it with the profile of the user and similarly clustered users on similarly clustered systems, it can be possible to verify the identity of the user and exclude their activity as noise. Any significant deviation in behavior from both the computer and the user should be a significant event and should be investigated as potentially being unauthorized and/or malicious.

In some cases, there may not be enough information (i.e., features, etc.) available on a single computing node to make a determination (using, for example, a machine learning or other predictive model), whether the interactions between a user and such computing node confirm the identity of the user and/or characterize normal user behavior. Further, data collection solely at a single computing node does not allow for multi-machine correlation of alerts regarding user behavior. Still further, data collection in isolation leads to data starvation when needing to adapt models for changing user behavior. Yet further, centralized collection and processing of data has inherent delays that prevent near real-time decision making.

With the current subject matter, data can be collected and processed locally. Using such locally collected data, user profiles can be generated (characterizing how the user typically interacts with the computing node) as well as computer profiles (which characterize how the computer reacts to typical user behavior). Further, an authentication score can be calculated that, for example, characterizes whether user behavior on a particular computing node across various user states (such as the ones identified above) indicate typical behavior for that the particular user or other related users. This authentication score can characterize whether the user is interacting with the computer system as expected. This authentication score can be calculated by one or more machine learning models that are trained using historical data that characterizes user interaction with such computer system as well as how the computer system responded to such interaction. Various types of machine learning models can be used including logistic regression models, neural networks (including concurrent neural networks, recurrent neural networks, etc.), support vector machines, random forest, and the like. In some cases, the historical data used to train such model is unique to a particular user. In other cases, the historical data is based, at least in part, to data generated by a plurality of similar users and roles interacting with such computer system (or with similar computer systems).

In some cases, the collected HCI data can be sent to a central processing server. This central processing can selectively update the machine learning models or take other actions with regard to the computing environment as a whole (e.g., global correlations, user clustering, computer clustering) or to specific nodes within such computing environment. In some instances, during authentication, data can be shared amongst the various nodes of the computing environment.

Figure 1:
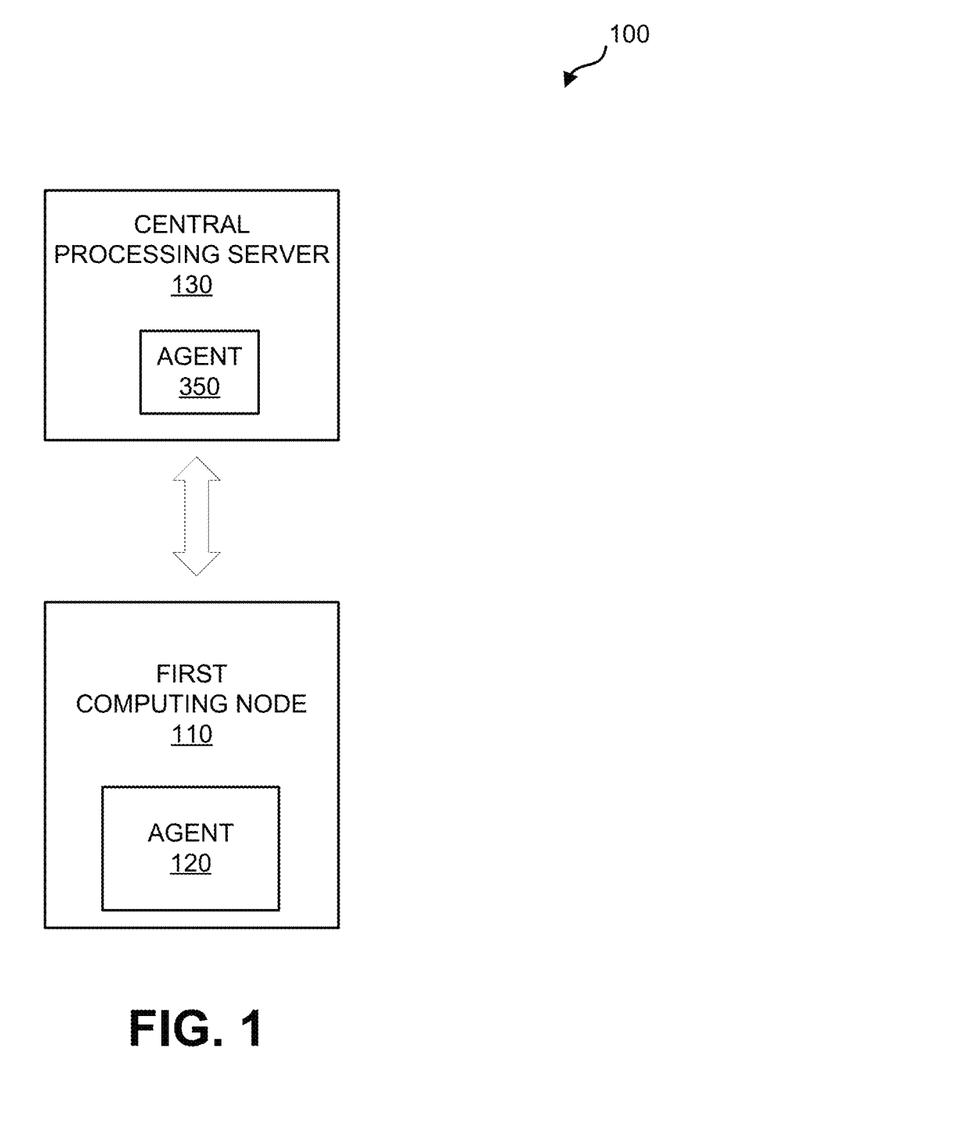
FIG. 1 is a diagram of a computing node interacting with a central processing server.

FIG. 1 is a diagram 100 illustrating a first computer (i.e., node or computing node) 110 having an agent 120 (e.g., software module, software application, etc.) executing thereon which is in communication with a central processing server 130 via a computing network (e.g., a network being wireless, wired, or a combination thereof). Prior to an initial logon by a user, the agent 120 can calculate an idle profile for the computer 110 prior to the HCI by the user. The idle profile can help characterize the type of computer it is and the role the computer has in its neighborhood. Thereafter, the user can login to the computer 110 by entering, for example, a username and password. If the user does not have a local profile (e.g., a locally created profile), the agent 120 can commence creating a user profile. If the user has a locally created profile (i.e., a profile resident within or otherwise accessible by agent 120), then the agent 120 compares the login information to such locally created profile. An authentication score can be generated (using, for example, one of the models described herein) that indicates (i.e., characterizes, etc.) how different the current logon is with the established profile. The agent 120 can subsequently cause the profile (whether previously created or created as part of the login process), any metadata associated with the login, such as external information (from Active Directory or an HRIS system), location of the user in relationship to the computer or predetermined roles from prior interactions with the computer, and the authentication score to the central processing server 130 (which in some variations can have a respective agent).

Further, in some variations, interaction with the computer can be reassessed against the user's profile, either periodically and/or based on specific triggers (e.g., events such as application launch, network service requests, etc.). For example, if the user runs a new application that requires Administrative privileges, the current authentication score can be measured against the current user's profile prior to the application's privilege escalation request to assure the user is still in control of their account. If the authentication score has deviated enough, a full authentication prompt requiring a username and password is present to the user. If not, the application runs unimpeded.

The user profile can be established with a combination of discrete and inferred information. Examples of discrete information include the username, the correct password, number of password attempts, the type of login (local, remote, interactive, non-interactive, etc.). The user profile can also include startup information (i.e., a startup profile) which characterizes activities upon startup such as applications launched at startup and/or services started. The user profile can also include keyboard dynamics information such as keystroke cadence, input device information including pressure applied, etc.

The inferred information in the user profile can include information such as logon hours, session lengths, logical location (i.e. where the corresponding computing node resides within the computing network, etc.), logon periodicity (i.e., how often the user logins), previous logon history, previously stored profile information (e.g., is the profile locally stored or centrally stored, etc.). This information can by gathered by the agent 120, through data stored in external systems like Active Directory or HRIS or from the central server 130. The inferred information can characterize the types of applications used by the user (e.g., user specific application, system applications, utilities, scripts, etc.). Data characterizing generated traffic can also form part of the inferred information including, for example, one or more of DNS queries, internet/intranet activity, web traffic. The inferred information can also include similar users, which type of computers have been accessed, information learned from other agents (e.g., authentication scores, login/access metadata, etc.). Similar users can be grouped either through similar discreet information, such as department or physical location, or they can be group through similarities in their profile model.

A computer profile can also be generated by the local agent 120, or in some variations, by the central processing server 130 or a combination of the local agent 120 and the central processing server 130. The computer profile can, for example, be established with idle and active information. The idle information can include the operating system type such as server, workstation, graphical user interface interactive, command line interface-based, and the like. The computer profile can also characterize one or more of hardware type (server, virtual machine, laptop, mobile phone, etc.), installed applications or services, logical location within a network, geographical location of the computer, network traffic profile when idle such as DNS activity and/or internet/intranet activity.

The active information forming part of the computer profile can include, for example, information characterizing running processes/services and performance characteristics, types users accessing the system and the frequency of their corresponding access, types of other computers accessing the systems and the frequency of their access, and/or network traffic profile when active.

Figure 2:
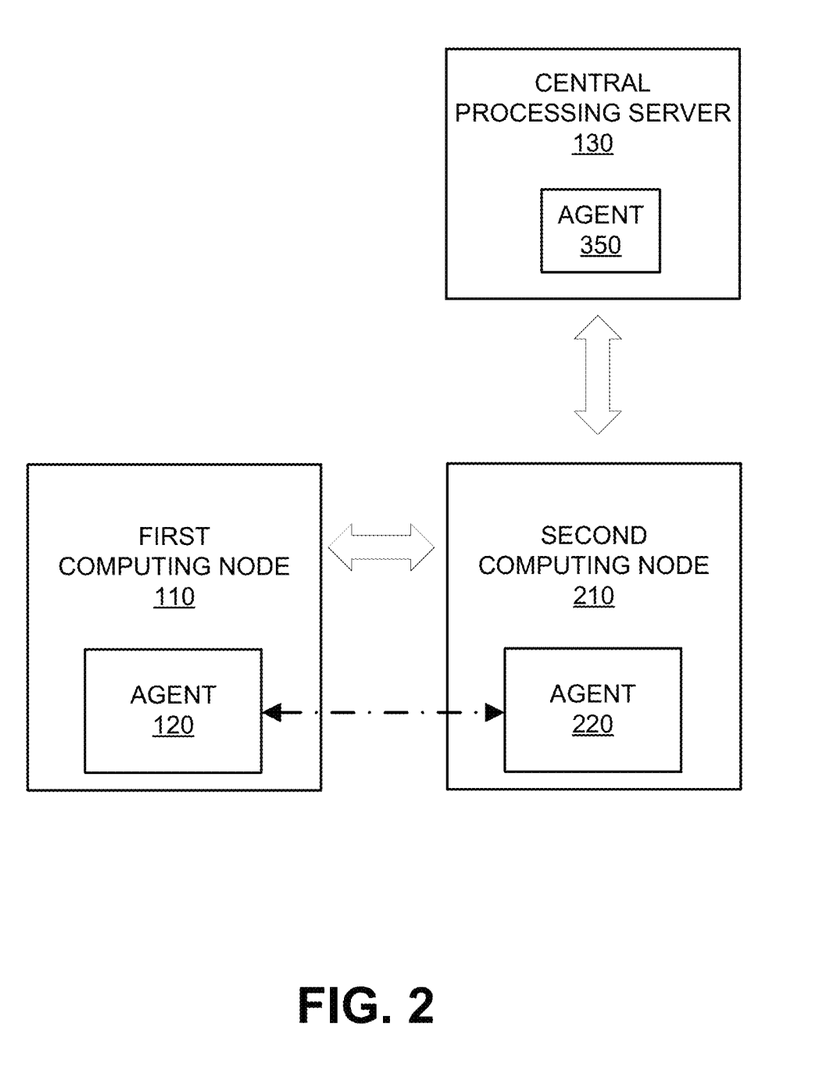
FIG. 2 is a first diagram of computing nodes forming part of a computing environment.

Referring now to diagram 200 of FIG. 2 which further includes a second computer (i.e., computing node, etc.) 210 that includes an agent 220 (similar to agent 220). When the user wishes to access the second computer 210 from the first computer 110, the first agent 120 sends the user profile and authentication score to the second agent 220. The second agent 220 can perform a profile comparison based on a locally saved profile and information obtained from the first profile, and if needed, a profile or other information from central processing server 130. Based on such comparison, a new authentication score can be generated by the second agent 220. If the new authentication score exceeds a pre-defined threshold, the second agent 220, can communications new information to the first agent 120. Thereafter, one or more of the first agent 120 or the second agent 220 can take action to stop or restrict access by the user to one or more of the first computer 110 or the second computer 210. Such action can include blocking the connection to the second computer 210, re-authenticating the user (i.e., prompting the user to provide their username/password again), and/or limiting access to only certain resources on one or more of the first computer 110 and/or the second computer 220. Information can then be sent, such as the newly adjusted user profile or other parameters, by either of the first agent 120 or the second agent 220 to the central processing server 130 that characterizes the taken action.

If the authentication score does not exceed the pre-defined threshold (indicating that the behavior of the user is within expected ranges but is still suspicious), then various actions can be taken. For example, an endpoint detection and response system (EDR) system can be enabled for a period of time. The EDR tool can collect information both relevant to a possible future forensic investigation and to measuring and building a short term, higher fidelity user profile model for later use in the system. Example EDR systems include, for example, those described in each of: U.S. patent application Ser. No. 15/961,659 filed on Apr. 24, 2018 and entitled: "Endpoint Detection and Response System With Endpoint-Based Artifact Storage", U.S. patent application Ser. No. 15/961,685 filed on Apr. 24, 2018 and entitled: "Endpoint Detection And Response System Event Characterization Data Transfer", and U.S. patent application Ser. No. 15/862,067 filed on Jan. 4, 2018, the contents of each of which application are hereby fully incorporated by reference. Once the EDR system/functionality is enabled, then the second computer 210 can communicate with the first computer 110 via the respective agents 220, 210. Further, the second agent 220 can send data to the central processing server 130 that characterizes such communications and, additionally, EDR information can be sent by the second agent 220 to the central processing server 130.

The central processing server 130 can be one or more computing nodes that collect data from all agents within the network environment/topology including the first agent 120 and the second agent 220. As mentioned above, the collected data can include user profiles, computer profiles, event metadata that contextualizes discreet information (such as external information from Active Directory or an HRIS), authentication scores and EDR generated data. In addition, the central processing server 130 can correlate enterprise-wide user and computer information. Such correlated information can be used to build relationships between users and creates user types, build relationships between computers and creates computer types, build relationships between user/computer type pairs. The central processing server 130 can also periodically recalculate user and computer profile models based on current organizational trends (e.g. users getting more skillful with a computer or new roles created at the organization) and distributes such profiles to the corresponding agents 120, 220.

The central processing server 130, using the various collected data, can calculate prevalence of key features. Such calculations can be used for rule-based detection and alerting. For example, if a computer is discretely determined to be a high value asset and the central processing server determines that users with a specifically calculated role are the only users that access that system, rules can be put in place to alert when users from outside the role attempt to access.

In addition, the central processing server 130 can manage the various agents 120, 220 which includes, for example (explain) as well as updating of models stored on the local computers 110, 210/agents 120, 220.

With one example of a normal user interaction, a user initially logs into its workstation (first computer 110). The agent on the workstation (first agent 120) can determined that the user activity matches a profile (stored locally or accessed from the central processing server 130). Based on such information, the agent on the workstation (first agent 120) can calculate an authentication score and such score, along with logon and profile deltas (i.e., differences from the user profiles/computer profiles and the user activity) to a central processing server (server 130) for processing.

In another example, in which there is a compromised user interaction (such as misuse of credentials, unauthorized lateral movement within the computing environment, etc.), the user initially logs into a workstation (first computer 110). The user inadvertently gets compromised by a phishing e-mail which causes one or more atypical/unusual processes are launched and detected. An authentication score can be recalculated (with the launched processes being, for example, an attribute used by the scoring model). With such processes, an attacker hijacks the user's credentials and attempts to establish persistence by making unusual system-wide changes, such as creating a scheduled task. An authentication score is then recalculated. Subsequently, the attacker attempts, from the workstation (110), to connect to the remote server (second computer 210) that the user normally logs into. The remote server (second computer 210) receives the updated user and/or computer profile and the recalculated authentication score. In this case, the agent (second agent 220) using such information deems the login to be unusual but not exceeding a threshold requiring remediation or other action. Such a determination may be because the origin of the connection is unknown or otherwise unexpected, but the connection to the remote server (210) is normal for this user.

The remote server (second computer 210) can report the logon event and profile deltas to the central processing server (server 130). An EDR system can begin collecting information as described above. The remote server (second computer 210) can then recalculate the authentication score based on the information collected by the EDR system. Subsequently, the remote server (second computer 210) can send the updated profile delta and the last recalculated score to the workstation (first computer 110). Further, the remote server (second computer 210) can send the updated profile delta and EDR information to the central processing server (server 130). The workstation (first computer 110) can then recalculate a new authentication score which, for example, can be used to determine whether to cease or otherwise restrict access at the workstation (first computer 110) or otherwise.

In still a further example, in which there is also a compromised user interaction (such as misuse of credentials, unauthorized lateral movement within the computing environment, etc.), the user initially logs into a workstation (first computer 110). The user inadvertently gets compromised by a phishing e-mail which causes one or more atypical/unusual processes are launched and detected. An authentication score can be recalculated (with the launched processes being, for example, an attribute used by the scoring model). With such processes, an attacker hijacks the user's credentials. Subsequently, the attacker attempts, from the workstation (110), to connect to the remote server (second computer 210) using the stolen credentials. The remote server (second computer 210) receives the updated user and/or computer profile and the recalculated authentication score. In this case, the agent (second agent 220) using such information deems the login to be unusual enough to exceed the maximum threshold. Such a determination can be based on, for example, the profile and authentication score do not match the utilized credentials, the user or computer profile has not history showing use of such login credentials, and/or the credentials not being used previously on the remote server (second computer 210). As a result, the remote server (second computer 210) can drop or otherwise sever the connection to the workstation (first computer 110). Further, the remote server (second computer 210) can send information characterizing such action (i.e., severing the connection, etc.) to the central processing server (server 130) and/or the workstation (first computer 110). The workstation (first computer 110) can then recalculate the authentication score and, based on the previous events, the score can cross a threshold which, in turn, forces the user to re-authenticate (i.e., login, etc.).

In an example of an insider threat, a user initially logs into their workstation (first computer 110). The workstation (first computer 110) determines that the user activity matches a user profile and an authentication score can be calculated. The workstation (first computer 110) later forwards the logon and profile deltas to the central processing server (server 130) for processing. Thereafter, the user connects to an atypical remote server (second computer 210). The remote server (second computer 210) can receive profile information and the current authentication score from the workstation (first computer 110) and determine that the connection is unusual but does not exceed a threshold requiring action. Unusual, in this regard, can be based on, for example, an abnormal (i.e., first time) computer/user pair and/or the fact that a corresponding user profile does not exist on the remote server (second computer 210). The remote server (second computer 210) in such a case can collect EDR information and send same to both the central processing server (server 130) and to the workstation (first computer 110).

Figure 3:
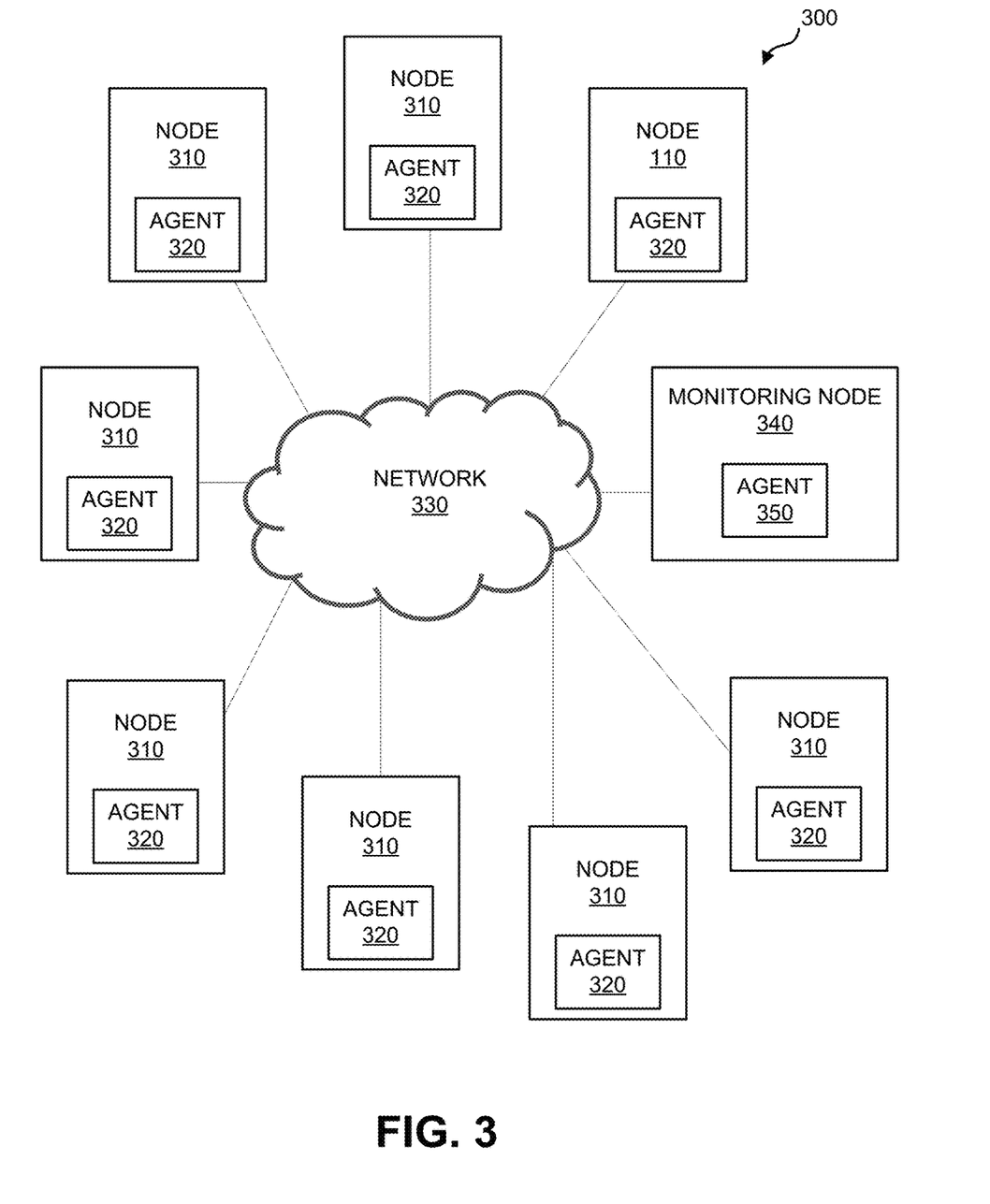
FIG. 3 is a second diagram of computing nodes forming part of a computing environment.

FIG. 3 is a diagram 300 illustrating a sample architecture for implementing the subject matter described herein wherein there are a plurality of computing nodes 310 each with a respective agent 320 executing thereon that can communication with each other over a network 330. Further, a monitoring node 340 (corresponding to the central processing server 130) can also have a respective agent 350 and can communicate with all of the nodes 310 via their respective agents 320.

Figure 4:
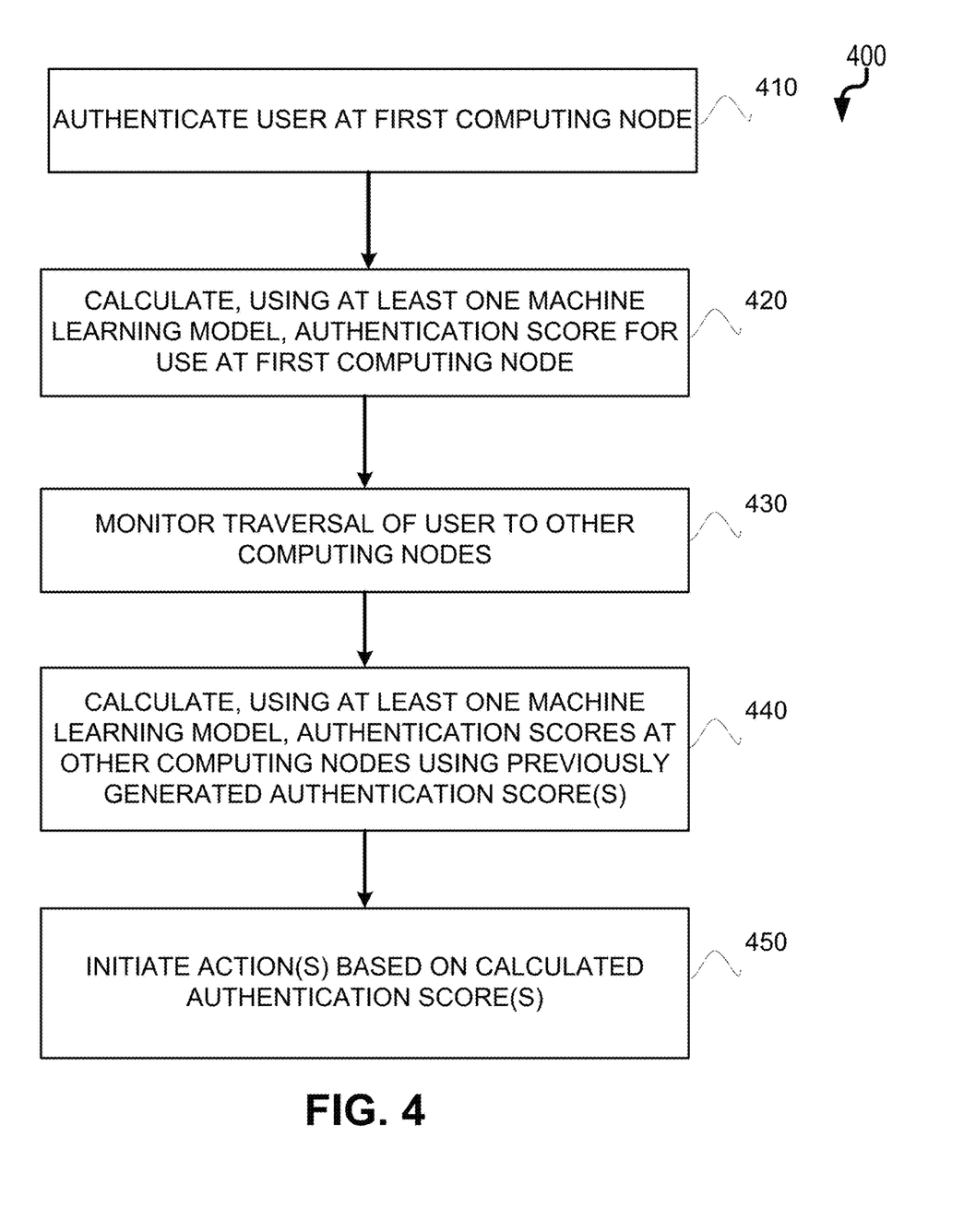
FIG. 4 is a process flow diagram illustrating verification of user identity based on their interaction with one or more computing nodes.

FIG. 4 is a process flow diagram 400 in which, at 410, an identity of a user on a first computing node of a plurality of nodes within a computing environment is authenticated. Thereafter, at 420, a first authentication score for the user is calculated at the first computing node using at least one machine learning model. The first authentication score characterizes interactions of the user with the first computing node. For example, the score can characterize whether a user's actions are typical or atypical in relation to such computing node. Subsequent to the authenticating, at 430, the traversal by the user from the first computing node to other computing nodes among the plurality of computing nodes is monitored. As part of such traversal, at 440, an authentication score is calculated at each of the nodes using respective machine learning models executing on such nodes. Such authentication scores characterizing interactions of the user with the corresponding computing node. Further, the respective machine learning models use, as an attribute, an authentication score calculated at a previously traversed computing node (i.e., the first computing node, the immediate preceding traversed computing node, etc.). Based on the calculated authentication scores, at 450, an action at one of the computing nodes is initiated.

Figure 5:
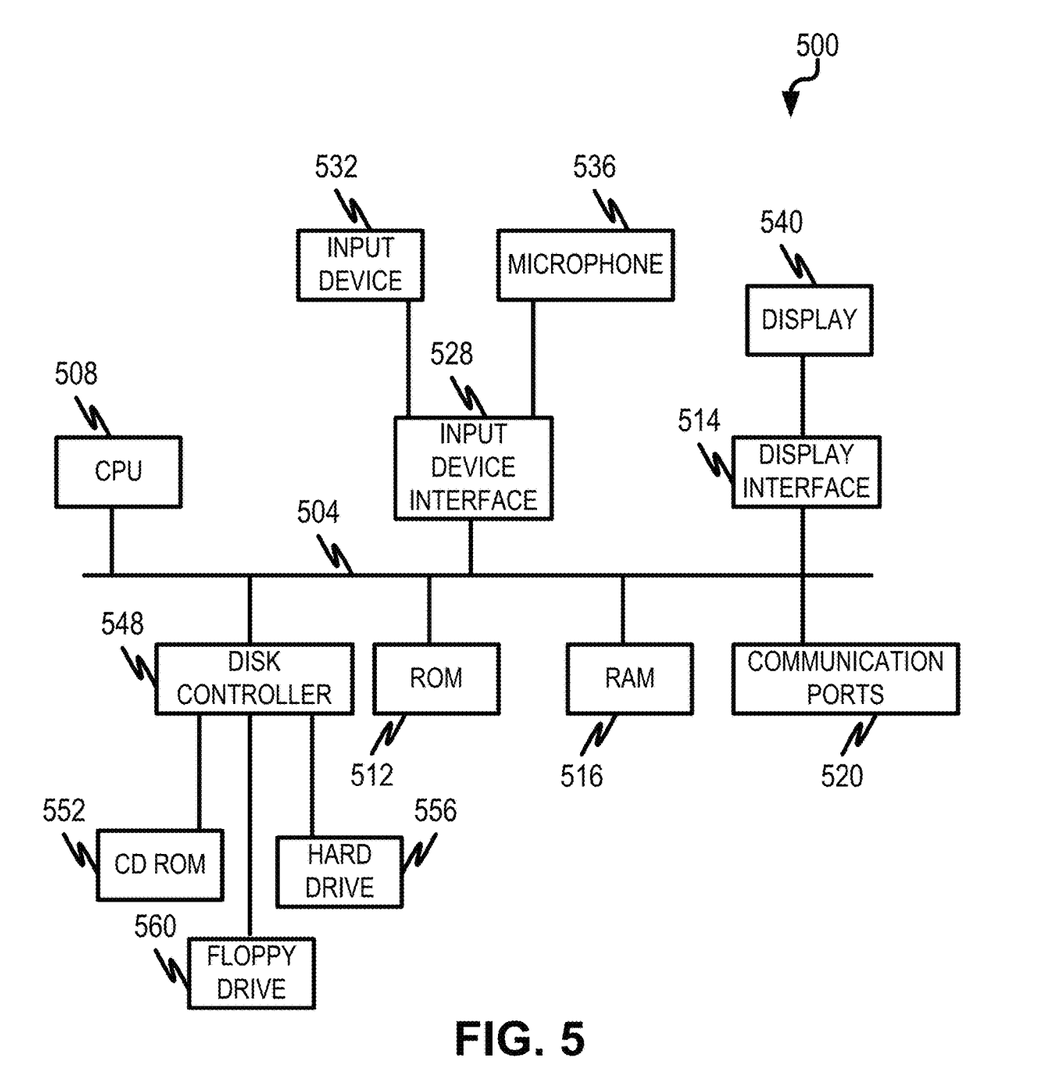
FIG. 5 is a diagram illustrating a computing device for implementing aspects described herein.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the communication port 520 includes or otherwise comprises a network interface.

To provide for interaction with a user, the subject matter described herein can be implemented on a computing device having a display device 540 (e.g., a CRT (cathode ray tube), OLED, or LCD (liquid crystal display) monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. In the input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   authenticating an identity of a user on a first computing node of a plurality of nodes within a computing environment;
   calculating, at the first computing node using at least one machine learning model and a user profile for the user, a first authentication score for the user, the first authentication score characterizing interactions of the user with the first computing node;
   first updating the user profile based on the first authentication score;
   monitoring, subsequent to the authenticating, traversal by the user from the first computing node to a first subsequently traversed computing nodes;
   receiving the first updated user profile by the first subsequently traversed computing node;
   calculating, at the first subsequently traversed computing node using a machine learning model executing on the first subsequently traversed computing node, a second authentication score characterizing interactions of the user with the first subsequently traversed computing node, wherein the machine learning model executing on the first subsequently traversed computing node uses, as an attribute, the first authentication score and the first updated user profile;
   second updating the user profile based on the second authentication score;
   monitoring, subsequent to the authenticating, traversal by the user from the first subsequently traversed computing node to a second subsequently traversed computing node;
   receiving the second updated user profile by the second subsequently traversed computing node;
   calculating, at the second subsequently traversed computing node using a machine learning model executing on the second subsequently traversed computing node, a third authentication score characterizing interactions of the user with the second subsequently traversed computing node, wherein the machine learning model executing on the second subsequently traversed computing node uses, as an attribute, the second authentication score and the second updated user profile; and
   initiating an action at one of the computing nodes based on one of the calculated authentication scores.

2. The method of claim 1, wherein the action comprises severing a connection between the user and the corresponding computing node when one of the authentication scores exceed a pre-defined threshold.

3. The method of claim 1, wherein the action comprises: re-authenticating the user at one of the computing nodes when one of the authentication scores exceed a first pre-defined threshold but are below a second pre-defined threshold.

4. The method of claim 1 further comprising:
   transmitting, by each of the computing nodes, the corresponding calculated authentication scores to a central processing server.

5. The method of claim 4 further comprising:
   transmitting, by the central processing server, at least one authentication score from a previously traversed computing node to a subsequently traversed computing node.

6. The method of claim 1 further comprising:
   accessing, at the first computing node, a user profile for the user; and
   identifying deltas between the user profile and current activity of the user on the first computing node;
   wherein the calculated authentication score is based on the identified deltas.

7. The method of claim 6, wherein the user profile characterizes user actions at each of a plurality of computing states.

8. The method of claim 7, wherein the states are selected from a group consisting of: freshly booted, interactive user login, non-interactive user login, user log out, or user session lock.

9. The method of claim 1 further comprising:
   recording, using an endpoint detection and response system, activities of the user at one of the computing nodes; and
   transmitting data characterizing the recorded activities to a central processing server.

10. A system comprising:
    at least one data processor; and
    memory storing instructions which, when executed by the at least one data processor, result in operations comprising:
       authenticating an identity of a user on a first computing node of a plurality of nodes within a computing environment;
       calculating, at the first computing node using at least one machine learning model and a user profile for the user, a first authentication score for the user, the first authentication score characterizing interactions of the user with the first computing node;
       first updating the user profile based on the first authentication score;
       monitoring, subsequent to the authenticating, traversal by the user from the first computing node to a first subsequently traversed computing nodes;

receiving the first updated user profile by the first subsequently traversed computing node;

calculating, at the first subsequently traversed computing node using a machine learning model executing on the first subsequently traversed computing node, a second authentication score characterizing interactions of the user with the first subsequently traversed computing node, wherein the machine learning model executing on the first subsequently traversed computing node uses, as an attribute, the first authentication score and the first updated user profile;

second updating the user profile based on the second authentication score;

monitoring, subsequent to the authenticating, traversal by the user from the first subsequently traversed computing node to a second subsequently traversed computing node;

receiving the second updated user profile by the second subsequently traversed computing node;

calculating, at the second subsequently traversed computing node using a machine learning model executing on the second subsequently traversed computing node, a third authentication score characterizing interactions of the user with the second subsequently traversed computing node, wherein the machine learning model executing on the second subsequently traversed computing node uses, as an attribute, the second authentication score and the second updated user profile; and initiating an action at one of the computing nodes based on one of the calculated authentication scores.

11. The system of claim 10, wherein the action comprises severing a connection between the user and the corresponding computing node when one of the authentication scores exceed a pre-defined threshold.

12. The system of claim 10, wherein the action comprises: re-authenticating the user at one of the computing nodes when one of the authentication scores exceed a first pre-defined threshold but are below a second pre-defined threshold.

13. The system of claim 10, wherein the operations further comprise:

transmitting, by each of the computing nodes, the corresponding calculated authentication scores to a central processing server.

14. The system of claim 10 further comprising the central processing server.

15. The system of claim 14, wherein the operations further comprise:

transmitting, by the central processing server, at least one authentication score from a previously traversed computing node to a subsequently traversed computing node.

16. The system of claim 10, wherein the operations further comprise:

accessing, at the first computing node, a user profile for the user; and identifying deltas between the user profile and current activity of the user on the first computing node;

wherein the calculated authentication score is based on the identified deltas.

17. The system of claim 16, wherein the user profile characterizes user actions at each of a plurality of computing states.

18. The system of claim 17, wherein the states are selected from a group consisting of: freshly booted, interactive user login, non-interactive user login, user log out, or user session lock.

19. The system of claim 10, wherein the operations further comprise:

recording, using an endpoint detection and response system, activities of the user at one of the computing nodes; and transmitting data characterizing the recorded activities to a central processing server.

20. A computer program product non-transitorily storing instructions which, when executed by at least one data processor forming part of at least one computing device, result in operations comprising:

authenticating an identity of a user on a first computing node of a plurality of nodes within a computing environment;

calculating, at the first computing node using at least one machine learning model and a user profile for the user, a first authentication score for the user, the first authentication score characterizing interactions of the user with the first computing node;

first updating the user profile based on the first authentication score;

monitoring, subsequent to the authenticating, traversal by the user from the first computing node to a first subsequently traversed computing nodes;

receiving the first updated user profile by the first subsequently traversed computing node;

calculating, at the first subsequently traversed computing node using a machine learning model executing on the first subsequently traversed computing node, a second authentication score characterizing interactions of the user with the first subsequently traversed computing node, wherein the machine learning model executing on the first subsequently traversed computing node uses, as an attribute, the first authentication score and the first updated user profile;

second updating the user profile based on the second authentication score;

monitoring, subsequent to the authenticating, traversal by the user from the first subsequently traversed computing node to a second subsequently traversed computing node;

receiving the second updated user profile by the second subsequently traversed computing node;

calculating, at the second subsequently traversed computing node using a machine learning model executing on the second subsequently traversed computing node, a third authentication score characterizing interactions of the user with the second subsequently traversed computing node, wherein the machine learning model executing on the second subsequently traversed computing node uses, as an attribute, the second authentication score and the second updated user profile; and initiating an action at one of the computing nodes based on one of the calculated authentication scores.

* * * * *